US012705646B2

(12) United States Patent
Mardini et al.

(10) Patent No.: US 12,705,646 B2
(45) Date of Patent: Aug. 11, 2026

(54) SYSTEM AND METHOD FOR DELIVERING DYNAMIC CUSTOMIZED CONTENT TO FUEL DISPENSERS

(71) Applicant: Pilot Travel Centers LLC, Knoxville, TN (US)

(72) Inventors: John Mardini, Knoxville, TN (US); Dipakkumar Kanudawala, Knoxville, TN (US)

(73) Assignee: Pilot Travel Centers LLC, Knoxville, TN (US)

( * ) Notice: Subject to any disclaimer, the term of this patent is extended or adjusted under 35 U.S.C. 154(b) by 0 days.

(21) Appl. No.: 18/517,967

(22) Filed: Nov. 22, 2023

(65) Prior Publication Data

US 2024/0169398 A1 May 23, 2024

Related U.S. Application Data

(60) Provisional application No. 63/427,149, filed on Nov. 22, 2022.

(51) Int. Cl.
*G06Q 30/0251* (2023.01)

(52) U.S. Cl.
CPC ..... *G06Q 30/0268* (2013.01); *G06Q 30/0255* (2013.01); *G06Q 30/0271* (2013.01)

(58) Field of Classification Search
CPC ........... G06Q 30/0268; G06Q 30/0255; G06Q 30/0271; G06Q 30/0207–0277; B67D 7/08
See application file for complete search history.

(56) References Cited

U.S. PATENT DOCUMENTS 6,810,304 B1 * 10/2004 Dickson .................... G07F 7/02 700/231
2009/0106094 A1 * 4/2009 DeLine .............. G06Q 30/0268 705/14.65
2015/0242892 A1 * 8/2015 Priebatsch ......... G06Q 30/0255 705/14.53
2016/0148230 A1 * 5/2016 Zeiger ................ G06Q 30/0217 705/7.32
2019/0228479 A1 * 7/2019 Williams .............. G07F 13/025
2021/0150644 A1 * 5/2021 Morris ................... G06V 20/52
2022/0207566 A1 * 6/2022 Braslavsky ........ G06Q 30/0255
(Continued)

FOREIGN PATENT DOCUMENTS

WO WO-2023158676 A1 * 8/2023 ............. G06N 20/00

OTHER PUBLICATIONS

Christine De Silva; Smart Platform for Fuel Loyalty Programs: Potential Opportunities and Digital Road Ahead; Nov. 1, 2019; IEEE.*

*Primary Examiner* — Arthur Duran
(74) *Attorney, Agent, or Firm* — Seth L. Hudson; Nicholas P. Stadnyk; Maynard Nexsen PC

(57) ABSTRACT

Systems and methods for dynamic content personalization at a fuel dispenser are provided. In one aspect, a method for content personalization and/or customization comprises an input device can receive an input corresponding to a user. Based on the received input by the system, a set of actions can be generated by a personalization engine to retrieve and/or display content. Subsequently, the set of actions can be processed by an application in logical communication with the personalization engine to retrieve and/or display content and/or additional input elements.

20 Claims, 10 Drawing Sheets

(56) References Cited

U.S. PATENT DOCUMENTS

2022/0343267 A1* 10/2022 Hairston ................ G06Q 20/20
2023/0009904 A1* 1/2023 Tägtström .............. G06V 20/52
2024/0111552 A1* 4/2024 Morris .................... G06F 9/451

* cited by examiner

208

200

606

600

SYSTEM AND METHOD FOR DELIVERING DYNAMIC CUSTOMIZED CONTENT TO FUEL DISPENSERS

CROSS-REFERENCE TO RELATED APPLICATIONS

This application claims priority to U.S. Provisional Patent Application No. 63/427,149 filed Nov. 22, 2022, which is incorporated herein by reference in its entirety.

FIELD

The technology described herein generally relates to systems and methods for delivering content to a digital platform, and more particularly to delivering dynamic customized consumer content to a fuel dispenser.

BACKGROUND

Advertising at a fuel pump or dispenser can be advantageous to brands as they afford an opportunity to advertise or market to a captive audience during a brief period of time when they are available to engage with a message.

Conventional marketing or video content presentation at a fuel dispenser is generally enabled through the static presentation of content based on some predetermined schedule, for instance as defined in a manifest associated with a content database.

Accordingly, the technology described herein improves conventional systems and methods of content delivery to a digital platform and enhances the customer experience at a fuel dispenser through the dynamic and customizable delivery of content that can be tailored to a customer.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are directed towards systems and methods for delivering personalized and/or customized content to a user, for example via a fuel dispenser, can be carried out by a dynamic content personalization engine and/or system According to some embodiments, a content personalization system, or a dynamic content personalization system for a fuel dispenser is provided. A dynamic content personalization and/or customization system as described herein can include at least one input device (e.g. a payment switch), a plurality of data streams, a personalization engine configured to process collected data with a ruleset to generate a sequence of actions corresponding to at least one of a command and an event (e.g. a command action and/or an event action), and at least one application to process the sequence of actions at a display, for example a display in operative communication with the input device, or for instance a display at a fuel dispenser.

According to some further embodiments a computer implemented method for dynamic content personalization at a fuel dispenser is provided. In some instances, an input device can receive an input corresponding to a user. Based on the received input by the system, a set of actions can be generated by a personalization engine to retrieve and/or display content. Subsequently, the set of actions can be processed by an application in logical communication with the personalization engine to retrieve and/or display content and/or additional input elements.

Additional objects, advantages, and novel features of the technology will be set forth in part in the description which follows, and in part will become apparent to those skilled in the art upon examination of the following, or can be learned by practice of the technology.

BRIEF DESCRIPTION OF THE DRAWINGS

Having described the disclosed subject matter in general terms, aspects of the technology presented herein are described in detail below with reference to the accompanying drawing figures, wherein.

DETAILED DESCRIPTION

Figure 1:
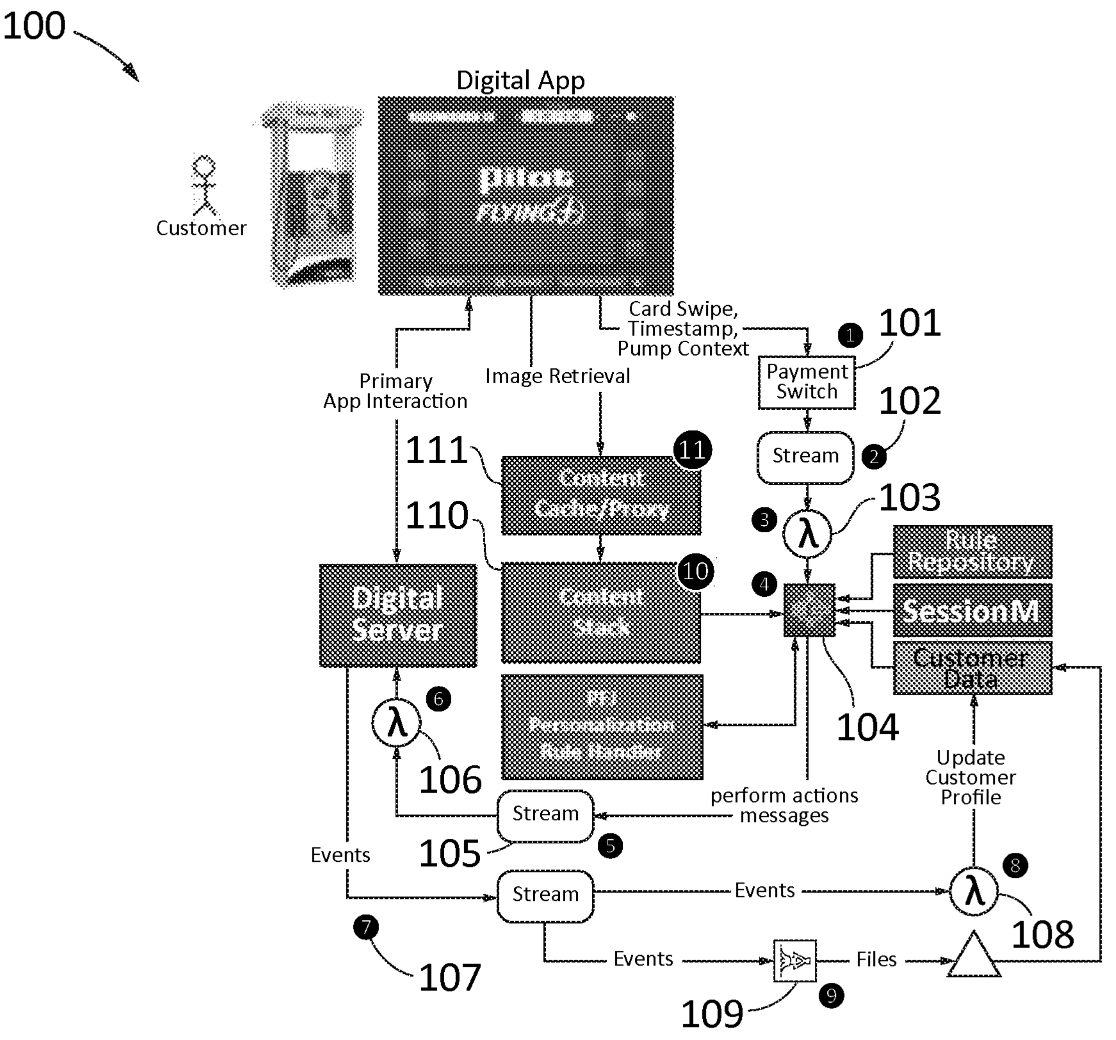
FIG. 1 illustrates an example content personalization and/or customization computing architecture and data flow, in accordance with some aspects of the technology described herein.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described.

Accordingly, embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the spirit and scope of the invention.

The presently disclosed subject matter will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

According to embodiments of the technology described herein, systems and methods for delivering dynamic personalized and/or customized content to a consumer and/or user are provided. In some instances, content can be delivered or otherwise provided to a consumer or user via a fuel dispenser, for example via a display at a fuel dispenser. In some instances, the personalization and/or customization and delivery of content to a user includes a user interaction component and/or user input. In some alternative embodiments, systems and methods for generating and delivering dynamic personalized messages to fuel dispensers at specific locations are provided, or based on another criteria, such as a date, time, etc. that may not necessarily be based on a user interaction.

Accordingly, systems and methods for delivering personalized and/or customized content to a user, for example via a fuel dispenser, can be carried out by a dynamic content personalization engine and/or system, also referred to herein in some instances as a personalization engine or personalization system. According to some aspects, a content personalization system can be made up of one or more components that make up a larger content delivery system, or can be implemented as part of a communications system or network. In some aspects, a content personalization engine can be implemented as a component of a content delivery system or communication system, which may include among others, a fuel dispenser having a display, a server, a datastore, and/or a network access point. In some aspects a display may be integrated into a fuel dispenser, and in some other aspects a display may be otherwise connected to a fuel dispenser.

In some embodiments, the content and/or personalization engine can be integrated with a content management technology platform, also referred to as a digital platform, that can additionally include a programmatic merchandising system. The digital platform can be employed as a contextually aware programmatic merchandising system that can automatically generate, modify, and distribute content (i.e. digital content) based on one or more parameters, criteria, inputs. In some instances, a digital content asset may be generated, modified, and/or distributed based on a determined context of the system.

According to various embodiments, a dynamic content personalization and/or customization engine is provided. Based on a least a first input to a content delivery system (e.g. a user input, a determined system input, a determined context), a personalization engine can generate a set of one or more event and/or command actions to retrieve, assemble, and/or display content on a display device, for example via a media delivery platform of a fuel dispenser. In some embodiments, event and/or command actions may be one of a showImage command, a showImage event, a showAsset command, a showContent command, a showQuestion command, a showQuestion event, or a combination of any of the forgoing. In some aspects it will be appreciated that some actions, such as one or more event actions are triggered in response to a user response, for instance a second input to the content delivery system, or further triggered by a second determined context.

Referring now to FIG. 1, FIG. 1 illustrates an example dynamic content personalization and/or customization engine computing architecture and data flow 100, in accordance with some aspects of the technology. As will be appreciated, the personalization engine architecture 100 as depicted is a conceptual diagram and is not meant to show all network and system boundaries. It should be understood that this and other arrangements described herein are set forth as examples. Other arrangements and elements (e.g. machines, interfaces, functions, orders, and groupings of functions) can be used in addition to or instead of those shown, and some elements or components can be omitted for the sake of clarity. Further, many of the elements and components described herein are functional entities that can be implemented as discrete or distributed components and/or functions and/or modules or in conjunction with other components, and in any suitable combination and location.

Various functions described herein as being performed by one or more entities can be carried out by hardware, firmware, and/or software. For instance, some functions can be carried out by a processor executing instructions stored in memory.

With reference to FIG. 1, a payment switch 101 can receive tokenized payment and/or loyalty card swipe events from a fuel dispenser, for instance when a user provides an input. The one or more raw messages from the payment switch are subsequently or immediately placed into a data stream 102, for example an AWS Kinesis stream. For example, the raw messages can be held in a queue or directly input to a data stream In some instances, additional processing may be necessary to perform identity lookups etc. and can be handled by a step function, as described below. A bridge function 103 consumes messages from data stream 102 and calls a step function for each message. The step function 104 (or step module) corresponding to each message from the data stream 102 is composed of multiple lambdas that retrieve data in parallel from the campaign management system, e.g. SessionM, a rule repository, and customer or consumer data stored in a database, for example one or more Dynamo DB tables. As will be appreciated a lambda or lambda architecture is a way of processing data that enables access to batch-processing and stream-processing in some instances as a hybrid method. In some aspects, the step function(s) are coordinated by a step module to coordinate in real time various aspects of one or more data streams, for instance, the step function or step module can take in and coordinate data and functions from a rule repository, a campaign management system, an information database (e.g. customer database), a content repository or content stack, and a rules handler, which can also in some instances read information from the rule repository. In some instances, these components may be separate, integrated, or grouped according to processing considerations.

Once the data has been collected, it is processed with the associated or corresponding rules by a rule handler (e.g. personalization and/or content rule handler) which creates a sequence of actions to include in one or more command messages. In some instances, all hyper-text markup language (HTML) and image assets are resolved against a content stack 110 headless content management system (CMS) to assemble the content payloads in the actions.

Once assembled or created, one or more perform action(s) commands are sent to another dedicated data stream 105, for example a dedicated Kinesis stream. A lambda 106, or other means, is then used to deliver the assembled commands to a digital server or application. As commands are processed in the application, events are generated that are delivered to another data stream 107, such as an event data stream, which can be another Kinesis stream. The generated events contain rich analytical and operation value.

A lambda 108 (or a plurality of lambdas, in some instances provided as one or more data layers) subsequently analyzes the event stream (i.e. data stream 107) for actions that change a customer data state that can be used by the personalization and/or customization engine on a next or subsequent customer encounter or event. In some instances, this can be at least a portion of a determined context. For example, if a user or customer has answered a question e.g. "do you like Mountain Dew?" there is no longer a need to ask the question again and that event data can become a part of the customer or user's operational profile stored in a database, such as a customer database (e.g. Dynamo DB) with eventual consistency with the data processed in a datalake. In some aspects, a user profile stored in a database (e.g. customer database) can be updated, stored, and called as a part of a context by the personalization engine. In some instances, a user profile can be called at least in part based on a user input provided at the payment switch in communication with the fuel dispenser. As will be appreciated, the one or more labdas or lambda modules or units operating in conjunction with the one or more data streams can process data in real-time, in batches, and/or in a hybrid fashion. In some instances, the data can be processed in one or more data layers which can each be responsive to a query or a pull from another component of the system.

A data extract, transform, and load (ETL) service or module 109 (e.g. Kinesis Firehose) can be used to capture, transform, and deliver streaming data to one or more data lakes. ETL service 109 can collect the events into files on an object storage infrastructure (e.g. an S3 bucket) that are processed by the datalake and subsequently used as input to synchronize customer data stored in one or more customer data tables (e.g. Dynamo DB customer data tables). When the application 114 (e.g. digital personalization application, which is configured to be in operative communication with digital sever 112) needs to load one or more content assets such as images, video, text, or a combination thereof, as specified in the content payload of one or more command component actions, content stack system 110 can deliver the assets. In some embodiments, for instance in large implementations where there are a plurality of fuel dispensers corresponding to one or more media platforms, a local content cache and/or proxy 111 can be provided to handle increased bandwidth, and be implemented to deliver one or more content assets via one or more data streams. In some instances, digital application 114 can be in operable communication with digital server 112, as well as content stack 110 and/or content cache and/or proxy 111. Accordingly, in some aspects, each of these components has push/pull capabilities with the other components based on the communication data streams. Coordination of components can be achieved through the digital application 114 or step module and/or function 104 which can incorporate coordination among various modules and or components within the system.

Figure 2:
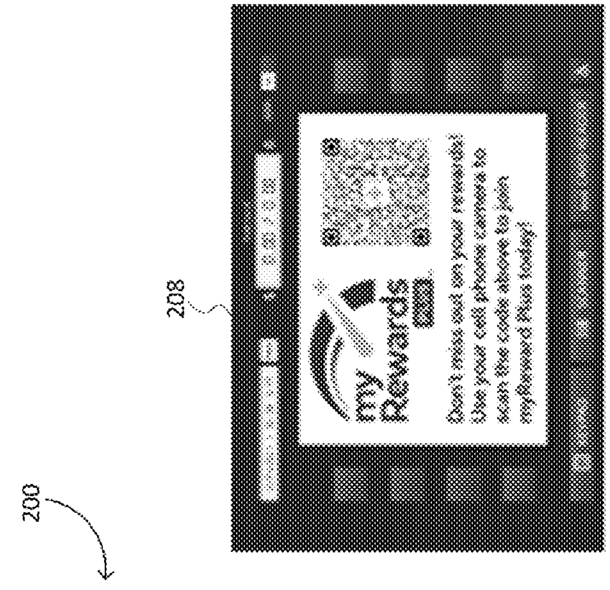
FIG. 2 illustrates an example command component for a content personalization and/or customization system, in accordance with some aspects of the technology described herein.
Figure 2:
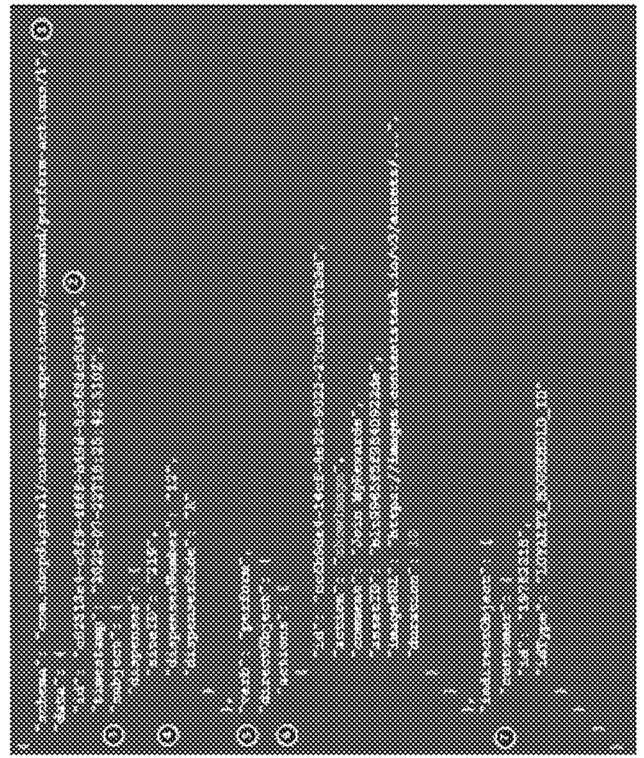

Turning now to FIG. 2, an example command component for a content personalization and/or customization system is illustrated via pseudo-code, according to some aspects of the present technology. Accordingly, FIG. 2 illustrates a show image command message 200 and corresponding event generation strategy. As shown at 201, each message payload has two top level elements: schema and data. The schema element allows for messages of different types to be mixed in a messaging system where a consumer or user can choose which messages to process, ignore, or route to another system. In this example, the namespace is com.shepdigital, and the message collection (API) is customer-experience. A command instructs the dispenser control system to imperatively do something, in this case perform-actions. The last digit 1 is the version of the message format to allow it to support updated formats in the future if needed.

At 202 each command has a unique id field that is a generated UUID4 that is used for identifying the message and corresponding events generated from performing the actions listed. The timestamp is the time at which the command was created. At 203, the message payload follows command/event grammar conventions where the structure of the command reads like a sentence. In this example, the command reads as "dispenser, perform action showImage to customer." At 204, the fuel dispenser information is provided so that the server system can know which dispenser to perform the actions on. The fields follow the Gilbarco simulator terminology, but could be changed to better match how the server would want to interpret them if needed. At 205, the provided verb in imperative form is "perform" indicating that the specified dispenser should execute the following list of actions. At 206, the ordered list of actions provides a step-by-step list of instructions for the application (e.g. digital application 114) to execute. For each action type, showImage in this example, there is a handler that knows how to render the action in the application. These handlers are managed within the application as a registry of actionHandlers, where based on the action the handler is invoked with the specified parameters. In the case that the action is not known to the registry, the action is skipped. This is to provide for forward compatibility and app robustness. Each action has its own unique id so that it may be correlated to the action in generated event messages. At 207, a portion of an event generation strategy is shown. Along with the rest of the payload, the customer fields in the indirectObject are modeled such that it is client agnostic. For example, Pilot will likely need two different id types, one for an internal loyalty system and another for a user token. By having an id, and an idType, and combination of values can be leveraged. These values are intended to be included in (copied into) any generated event messages so that the Pilot event collectors and processors can keep track of the actions presented to the specific customer as well as the duration of the actions and any action generated data. As shown at 208, example content delivered to an interface via an application, i.e. a multimedia platform, is illustrated.

Figure 3:
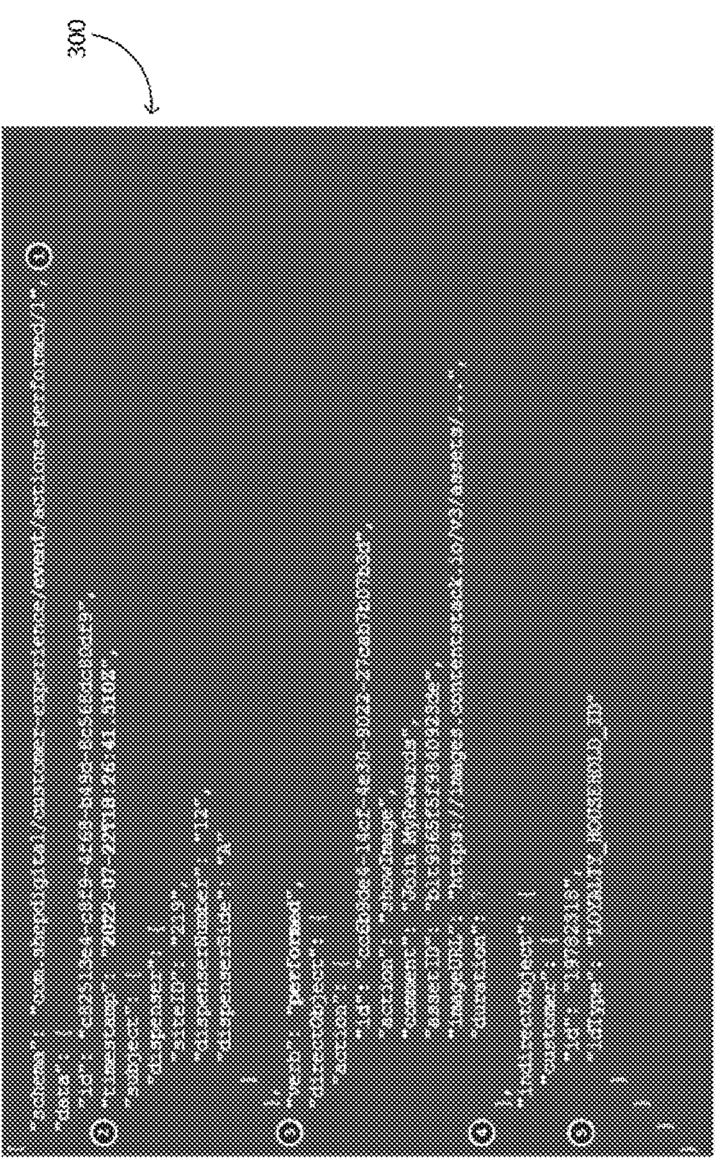
FIG. 3 illustrates an example event component for a content personalization and/or customization system, in accordance with some aspects of the technology described herein.

FIG. 3, shows an example event component for a content personalization and/or customization system and is illustrated via pseudo-code, according to some aspects of the present technology. Accordingly, FIG. 3 illustrates a show image event message 300. At 301, each command message can result in one or more event messages being generated. Unlike to the command message, which imperatively tells the application what to do, the generated event messages are intended to capture information about things that have happened. Note that the schema line is different containing “event” and the verb is past tense. This allows for the messages to be easily differentiated in a message stream, for example AWS Kinesis. At 202, as a lightweight implementation strategy, the original command message can be copied and fields altered to construct the event messages, one for each action performed. The timestamp field should be set to the time the action completed. Because the duration is recorded on the action, the start time can be calculated. As shown at 303, event verbs are in the past tense to represent that something happened.

At 304, the duration of the action is set to how long it was shown on the dispenser. Although the command may have specified a duration of 10 seconds to be shown, in this case the customer ended fueling while the image was shown on the dispenser and thus for only 7 seconds. This timing may be important for 3rd party ad impression display time, for example, how many total seconds were advertisements for Coca-Cola shown to customers. This timing is also critical for customer interaction analysis and behavior analysis. Then at 305, the customer id attributes are copied into the message such that processing the event log overhead is minimized and can be performed on-stream with fewer data lookups. For example, Pilot would likely desire digitally generated events to be delivered to an AWS Kinesis stream where multiple consumers are processing the event messages. The primary consumer would be an AWS Lambda function to inform the core personalization engine of customer completed actions. An additional event consumer would be the SessionM campaign management system where audience memberships may be changed in response to an event happening. A Kinesis Data Firehose would also be leveraged to collect events into files on S3 buckets for batch analytics processing with, for example, Databricks.

Figure 4:
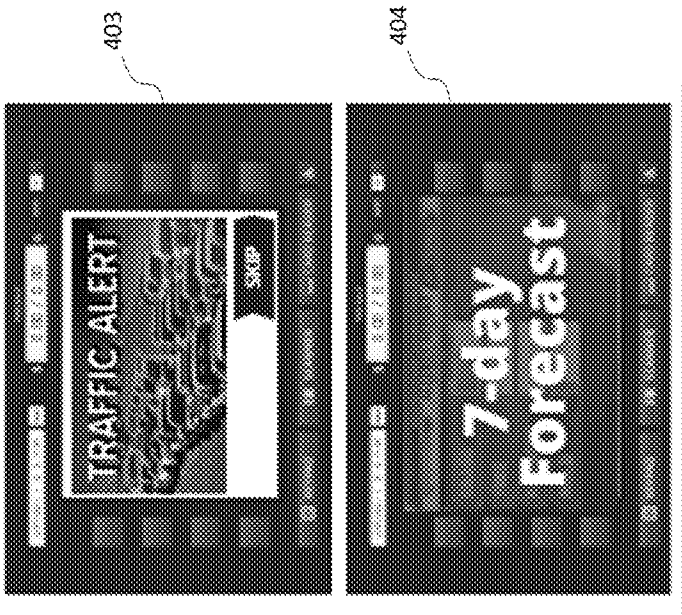
FIG. 4 illustrates an example command component for a content personalization and/or customization system, in accordance with some aspects of the technology described herein.
Figure 4:
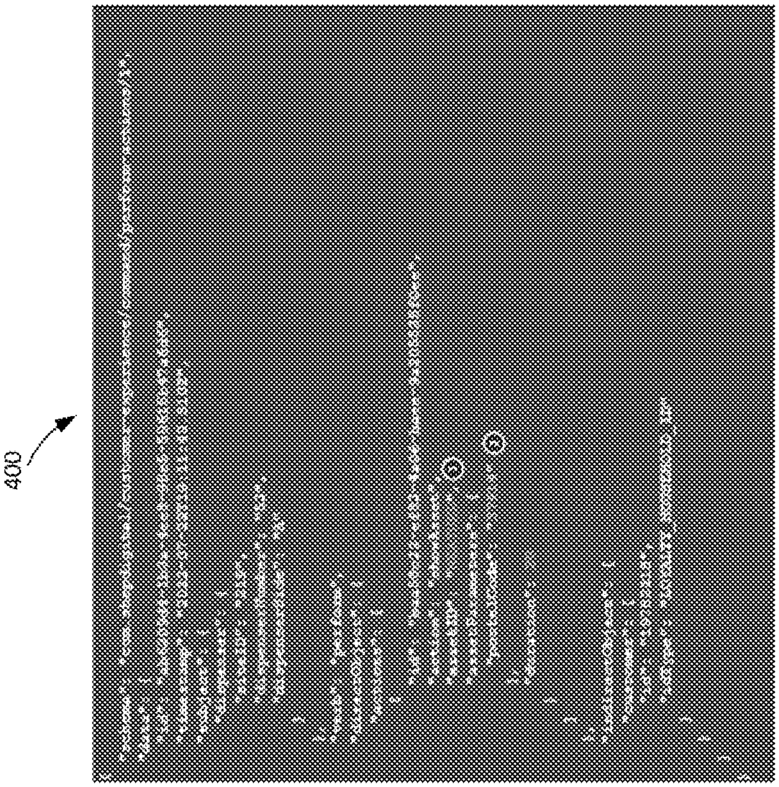

Referring to FIG. 4, an example command component (or command message) for a content personalization and/or customization system is illustrated via pseudo-code, according to some aspects of the present technology. Accordingly, FIG. 4 illustrates a show asset command message 400. At 401, the showAsset command is used to trigger a content handler within the application that is managed a digital server. Example assets to show may be local WEATHER, TRAFFIC, NEWS, LOTTERY advertisements, or other services not specific to Pilot service offerings. The assetID can be either generic like the terms provided above or specific keys provided by the digital server or service. The application will have action handlers that know how to render these assets for the specified duration (20 seconds in this example) as shown below. The personalization engine determines which locations to generate commands to these special assets, for example traffic is likely a concern in Seattle WA, but not Paducah Ky. At 402, the assets will likely need parameters that guide their operation like which postal code the WEATHER asset should be shown for. These parameters would be defined by the digital service operating and/or maintaining the server in some instances. Postal code seems to be relevant for most of the services listed above, however other parameters may be needed as well and would be placed as attributes of the asssetParameters object. Like the other generated events the duration is set to how long the asset was visible to the customer. Typically, the duration in the produced event would be the same as the command duration unless the customer had ended fueling during the display of the asset which would yield a smaller duration like 7 seconds. Attribute “skipped”: true could also be added if customer presses a “skip” button. As shown in 403 and 404, example content delivered to an interface via an application, i.e. a multimedia platform, is illustrated where the show asset command component as described above is implemented.

Figure 5:
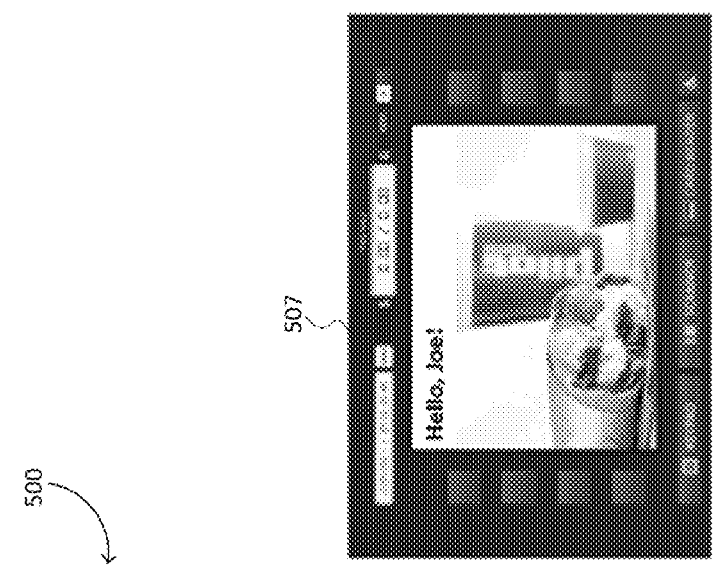
FIG. 5 illustrates an example command component for a content personalization and/or customization system, in accordance with some aspects of the technology described herein.
Figure 5:
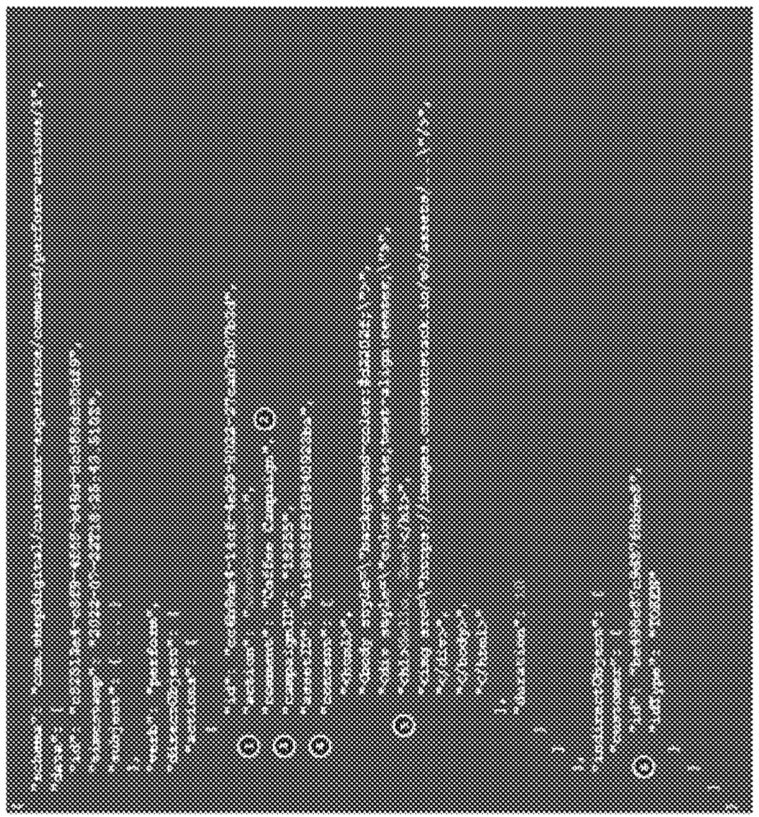

Referring to FIG. 5, an example command component (or command message) for a content personalization and/or customization system or engine is illustrated via pseudo-code, according to some aspects of the present technology. Accordingly, FIG. 5 illustrates a show image command message 500. At 501, the showContent action is similar to the showImage command, but instead of just an image, the entire HTML5 payload is provided. As shown at 502, the comment attribute is optional and is intended to describe the intent of the content to a consumer or user. At 503, if a marketing campaign is tied to the content, it may be included here. This is then copied into the produced event message so that campaign analytics can applied directly against the resulting event messages. At 504, the content attribute is an array of string values. The array of strings should be concatenated together (optionally with a newline separator) to produce the content to be rendered on the dispenser by the application. Treating this attribute as an array of strings instead of a single value allows for better human readability of the HTML in the payload. At 505, the application does not need to perform any modification of the HTML5 content as the content has been assembled by the Pilot personalization engine before being transmitted to the digital server or content service. An alternate way to handle this would be to provide a sub-object named variables to the action object and allow for templated substitution. For example <h1>Hello, Joe!</h1> could read <h1>Hello, {name}!</h1>, and the variable “name”: “Joe”. This content should also be pre-targeted for the screen dimensions by the personalization engine because the dimensions of the screen can be known at point of first interaction by the payment switch i.e. card swipe at dispenser 12 side A at site 219 which has a 10.4" screen. An alternate approach would be to provide content that uses relative scaling in embedded CSS styles so that it auto-scales to the screen size. At 506, as will be appreciated in this example, a token is used as the customer or user identifier instead of a loyalty id. As can be seen in 507, example content displayed in lie with the described show image command message is illustrated.

Figure 6:
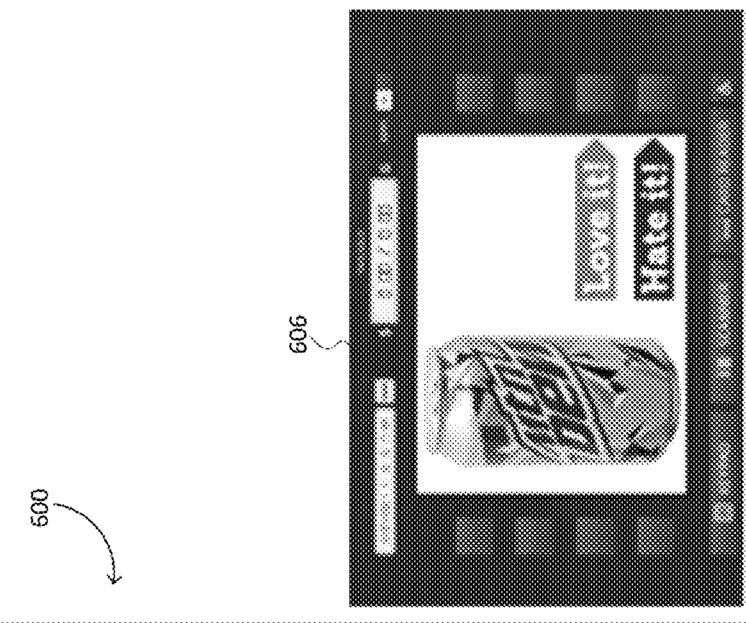
FIG. 6 illustrates an example command component for a content personalization and/or customization system, in accordance with some aspects of the technology described herein.
Figure 6:
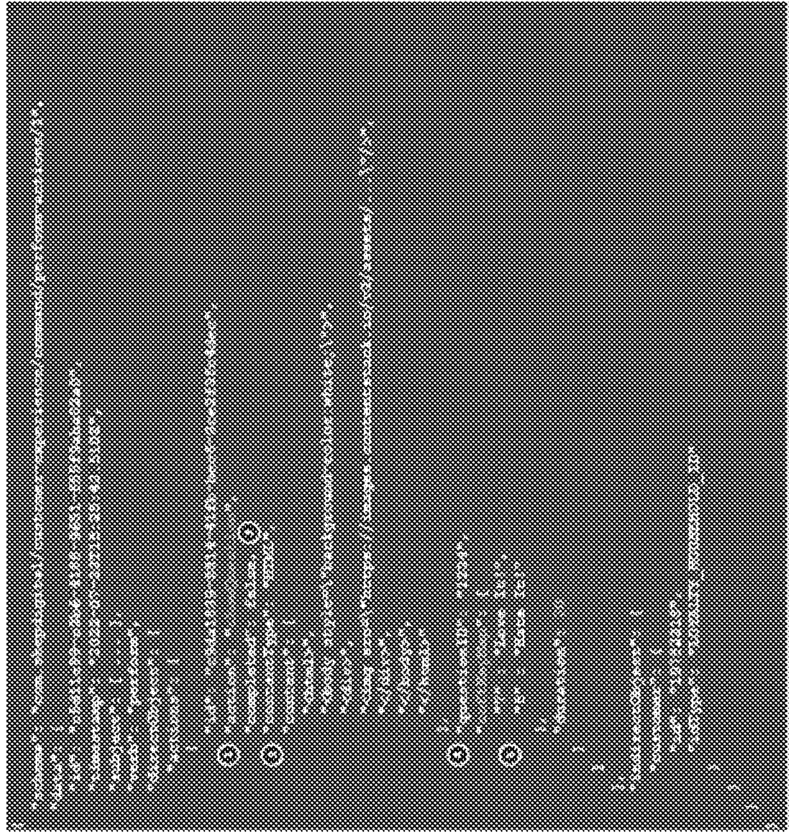

FIG. 6, depicts an example command component (or command message) for a content personalization and/or customization system or engine illustrated via pseudo-code, according to some aspects of the present technology. Accordingly, FIG. 6 illustrates a show question command message 600. At 601, the concept of a question in the customer experience is to show the customer content, and allow the customer to press a soft key to provide feedback.

For example, in the illustrative image 606 a can of Mountain Dew is shown with two possible soft key choices "Love it!" and "Hate it!" which are part of the delivered image and point to soft keys 7 and 8 respectively. The question is shown for the provided duration of 20 seconds in this example. If the customer presses soft key 7 or 8, an event is generated wan an "answer": "Love It!" attribute added to the action, and the next action in the list of actions is shown. At 602, the list of actions is repeated once the end of the action list has been reached. If the customer has responded to a question, we need to mark the question in the application as completed so that the question is not asked again. If the customer has not answered the question, it may be shown again. The "completed" flag on the action is intended for this purpose. The default value if not present is considered false, thus if a customer answers a question the attribute "completed": true is added to the command in memory. At 603, it will be appreciated that this is an example of providing a contentType and content attributes where contentType could be extensible and starting with two types: HTML and IMAGE and possibly VIDEO in the future where the content tag then contains either HTML or an image or video URL to show full-screen. This technique could also be used for the showImage and showContent commands instead of having them be separated as described hereinabove. At 604, the questionID is a unique identifier for back-end tracking so that the answer event can be correlated to the question. At 605, a softKeyMap provides a mapping between the soft key number and the generated value to pass as the "answer" attribute in the generated event. If a soft key is pressed by a customer that is not in the mapping, it is ignored. Another potential use case is a "skip" button that causes the question to be answered with skip and the completed attribute set to true.

Figure 7:
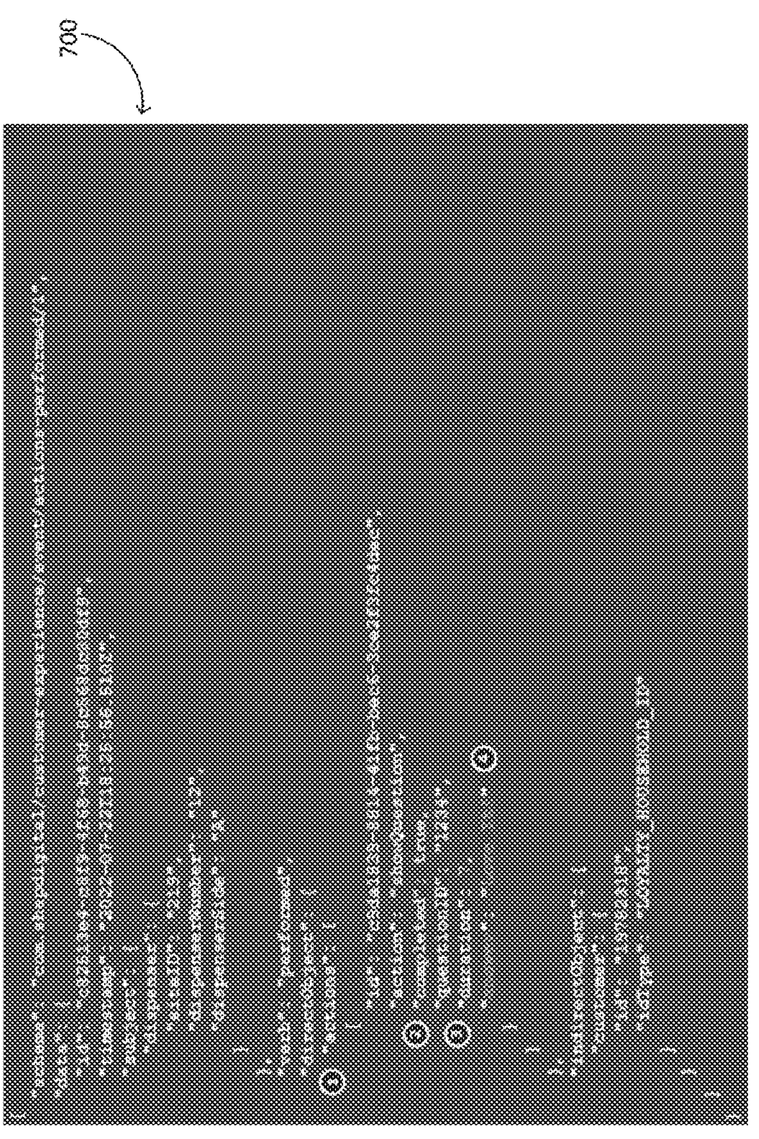
FIG. 7 illustrates an example event component for a content personalization and/or customization system, in accordance with some aspects of the technology described herein.

FIG. 7, shows an example event component for a content personalization and/or customization system and is illustrated via pseudo-code, according to some aspects of the present technology. Accordingly, FIG. 7 illustrates a show question event message 700. As will be appreciated at 701, the contentType and content are not included in the generated event message. This is optional, and could help reduce the size of the event message. The general strategy is to use the original command as a template to create a copy of the elements, update and add few attributes and then return the event. This can save time vs. creating the full event body from scratch. At 702, in this example the "completed" attribute was set to true meaning that the customer interacted with the question and provided a response. This also means that the command should not be executed again if the list of actions is processed more than once as described in the showQuestion Command of FIG. 6. If the customer did not provide input, then the "completed" attribute would be false. At 703, the duration is how long the content had been displayed before the customer interacted with the dispenser screen by pressing a soft key. In this case, the customer had interacted after 7 seconds of displaying the content. Note that if the customer did not interact the duration would typically be the same as the command duration of 20 and the "completed" attribute would be set to false. In the event that the question was not show for the full amount of time because the customer finished fueling, then "completed" would be false, and the duration set to how long the content was shown, for instance 10 of the 20 seconds. At 704, the "answer" attribute is populated with the value specified in the command softKeyMap. In this example, the customer pressed soft key #7 indicating that for questionID 1234 about liking Mountain Dew they had chosen the "Love It!" answer.

Figure 8:
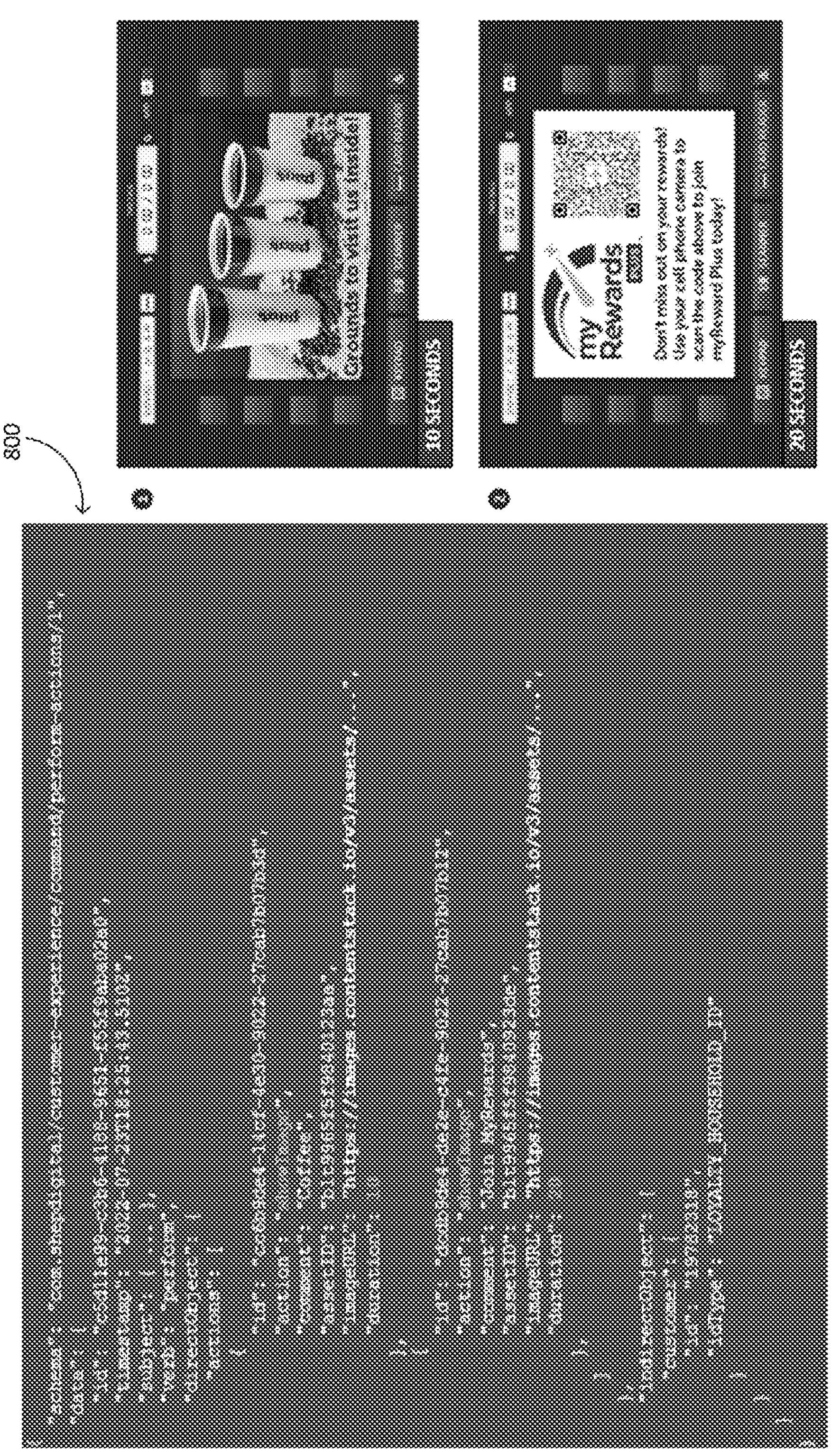
FIG. 8 illustrates example multi-action handling in a content personalization and/or customization system in accordance with some aspects of the technology described herein.

Referring to FIG. 8, the handling of multiple actions in a content personalization and/or customization system or engine is illustrated via pseudo-code, according to some aspects of the present technology. Accordingly, FIG. 8 illustrates multiaction component 800. As depicted, when multiple actions are provided, they are sorted by display order and the length of time that they should be shown on the screen is provided as the duration. In this example, the list of actions has two entries: one for coffee e.g. content item 801 and one for MyRewards, e.g. content item 802. Once each of the actions in the actions list has been performed, the list of actions starts again from the beginning. If the action specified is not known, the action is skipped. If the list of actions is empty, then default content (e.g. a static asset) will be presented.

Figure 9:
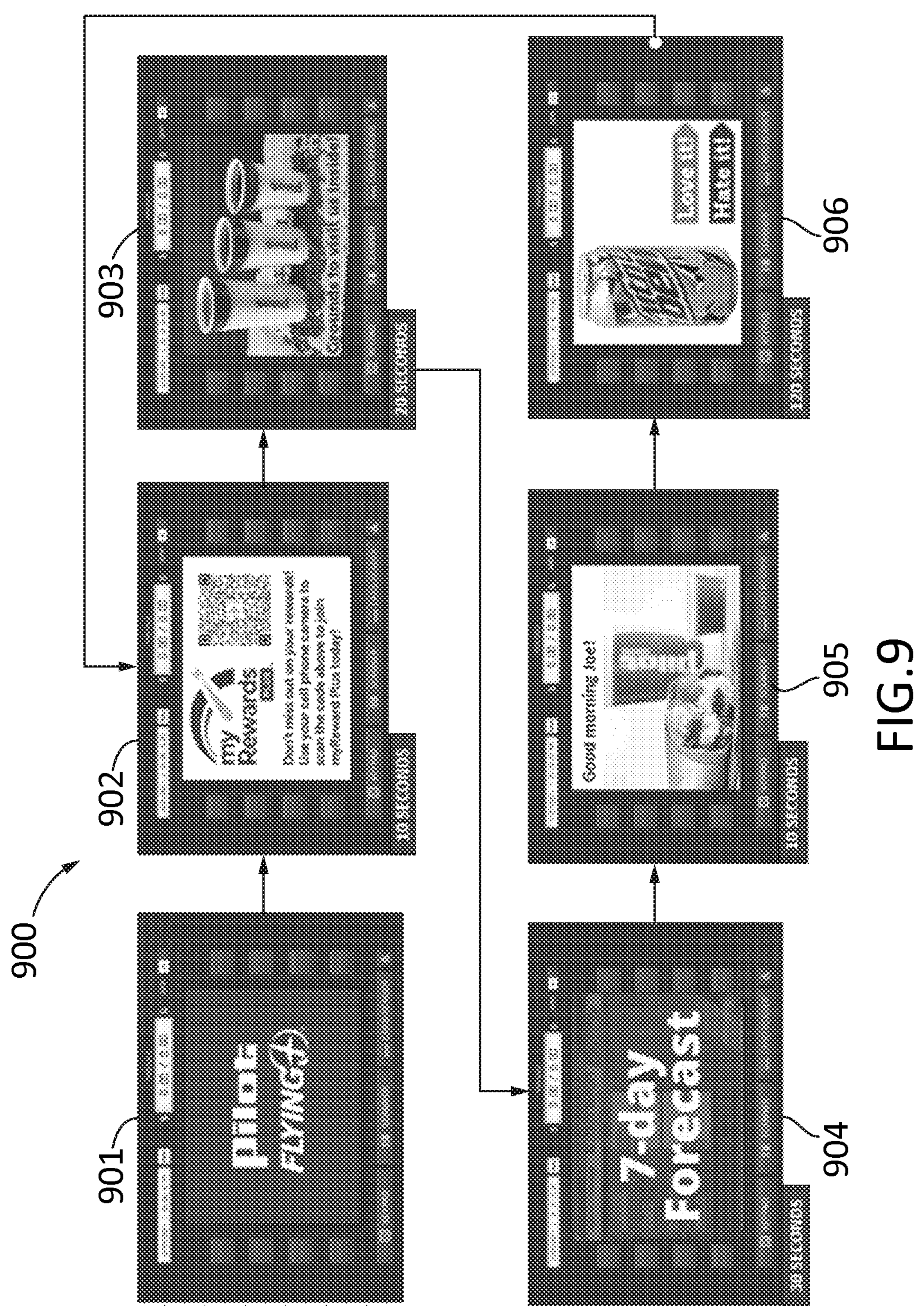
FIG. 9 is an example method of delivering personalized and/or customized content to a consumer, in accordance with some aspects of the technology described herein.

Having described various aspects of a content personalization and/or customization system or engine, example methods are described below for implementing the forgoing and providing a user experience by delivering personalized and/or customized content to a consumer, in accordance with some aspects of the technology described. Referring to FIG. 9 in light of FIGS. 1-8, a flow diagram illustrating an example user experience 900 is provided. The blocks of method 900 and other methods described herein can be carried out by user action, computing processes, digital conversion processes, or a combination comprising the foregoing. In some instances, blocks of method 900 and other methods described herein comprise a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application or combination of applications, a service or hosted service (standalone or in combination with another hosted service), or a plug-in to another product, to name a few.

At block 901, an initial dispenser screen state is displayed showing a general or piece of content, for instance a company logo. A customer or user swipes a payment card or loyalty card which initiates a message to the personalization or customization engine that produces or generates a list of actions to perform, which are then sent to a digital server, for example the digital server depicted in FIG. 1. At block 902, the personalization engine can make a determination that a customer is or is not a member of a loyalty program. Here, the personalization engine determined that the customer is not a member of the loyalty program and decided to show the user a way to join the loyalty program as the highest priority action using a showimage action. In some instances, this action may be displayed for a determined amount of time, for example 10 seconds. At block 903, the next action was determined to be another showImage action to promote coffee sales and encourage customers to enter the store for an in-store upsell. In some instances, this action may be displayed for a determined amount of time, for example 20 seconds. At block 904, it is determined that a showAsset "WEATHER" command is employed where the local weather based on the zip code is returned, presented and/or otherwise displayed by the application in order to provide value to the customer or user. In some instances, this action may be displayed for a determined amount of time, for example 30 seconds. At block 905, the showContent command can display a personalized greeting, tasteful joke, or targeted offer, amongst other personalized or customized items. In this example, the customer's name is known and the system employing the actions can present a targeted greeting to the customer based on the, for instance, time of day at the dispenser (e.g. morning, afternoon, evening). In this example, a breakfast combo is shown. In some instances, this action may be displayed for a determined amount of time, for example 10 seconds. At block 906, one of the last screens that a user could be prompted with is a showQuestion command, where data collected from a presented or displayed question is used to personalize future interactions with the user or customer. If the fueling session continues, the determined customer experience can be started over from the beginning until fueling is complete. In some instances, this action may be displayed for a determined amount of time, for example 120 seconds.

Accordingly, various aspects of technology for delivering dynamic customized consumer content to a fuel dispenser is described. It is understood that various features, sub-combinations, and modifications of embodiments described herein are of utility and can be employed in other embodiments without reference to other features or sub-combinations. Moreover, the order and sequences of example method 900 are not meant to limit the scope of the present technology in any way, and further these steps or blocks can occur in a variety of different sequences within the described embodiments. Such variations and combinations thereof are also contemplated to be within the scope of embodiments of the invention.

Figure 10:
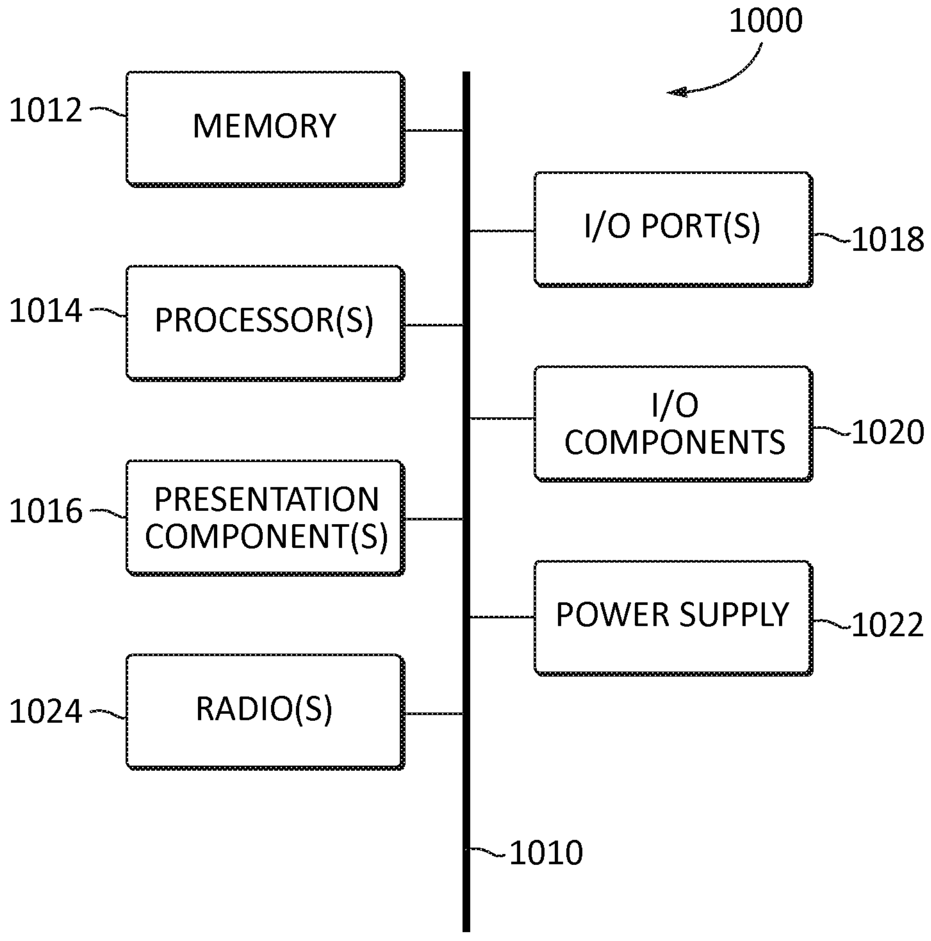
FIG. 10 is a block diagram of an example computing environment and/or device architecture in which some implementations of the present technology may be employed.

Referring now to FIG. 10, FIG. 10 provides an illustrative computing device and/or environment for implementing embodiments of the present invention is shown and designated generally as computing device 1000. Computing device 1000 is merely one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention can be described in the general context of computer code or machine-useable instructions, including computer-executable instructions such as program modules, being executed by a computer or other machine (virtual or otherwise), such as a smartphone or other handheld device. Generally, program modules, or engines, including routines, programs, objects, components, data structures etc., refer to code that perform particular tasks or implement particular abstract data types. Embodiments of the invention can be practiced in a variety of system configurations, including hand-held devices, consumer electronics, general-purpose computers, more specialized computing devices, etc. Embodiments of the invention can also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. In some embodiments, devices described herein utilize wired and rechargeable batteries and power supplies. Bus 1010 represents what can be one or more busses (such as an address bus, data bus or combination thereof). Although the various blocks of FIG. 10 are shown with clearly delineated lines for the sake of clarity, in reality, such delineations are not so clear and these lines can overlap. For example, one can consider a presentation component such as a display device to be an I/O component as well. Also, processors generally have memory in the form of cache. It is recognized that such is the nature of the art, and reiterate that the diagram of FIG. 10 is merely illustrative of an example computing device that can be used in connection with one or more embodiments of the present disclosure. Distinction is not made between such example categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000, and includes both volatile and non-volatile media, removable and non-removable media. By way of example, and not limitation, computer-readable media can comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared, NFC, Bluetooth and other wireless media. Combinations of any of the above should also be included within the scope of computer-readable media.

Memory 1012 includes computer storage media in the form of volatile and/or non-volatile memory. As depicted, memory 1012 includes instructions 1024, when executed by processor(s) 1014 are configured to cause the computing device to perform any of the operations described herein, in reference to the above discussed figures, or to implement any program modules described herein. The memory can be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which can be built in. Illustrative components include a microphone, joystick, game pad, satellite dish, scanner, printer, wireless device, battery, etc.

Some embodiments of computing device 1000 can include one or more radio(s) 1024 (or similar wireless communication components). Radio 1024 transmits and receives radio or wireless communications. The computing device 1000 can incorporate a wireless terminal to receive communications and media over various wireless networks via any number of wireless protocols.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The terms "a," "an," and "the" refer to "one or more" when used in this application, including the claims. Thus, for example, reference to "a subject" includes a plurality of subjects, unless the context clearly is to the contrary (e.g., a plurality of subjects), and so forth. Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

Although the foregoing subject matter has been described in some detail by way of illustration and example for purposes of clarity of understanding, it will be understood by those skilled in the art that certain changes and modifications can be practiced within the scope of the appended claims. Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims.

The invention claimed is:

1. A system for digital content personalization and delivery at a fuel dispenser, the system comprising:

a fuel dispenser comprising a digital display and a payment switch to receive a swipe event from a user;

a plurality of data streams;

a personalization engine comprising a step function module comprising a plurality of lambda units and a personalization rule handler to process a collected dataset with a ruleset to generate one or more command messages, each command message comprising a sequence of actions, each action of the sequence of actions corresponding to a command or an event, wherein at least a portion of the sequence of actions comprise a digital content payload, wherein the step function module generates the collected dataset by retrieving data in parallel from a customer data repository, a campaign management system, and a rule repository, and wherein the personalization rule handler processes the collected data set with associated rules from the rule repository;

a digital server to receive the one or more command messages including the sequence of actions comprising the digital content payload; and an interactive application in communication with the digital server to process the one or more command messages on a display of the fuel dispenser, wherein the processing comprises displaying digital content on the digital display of the fuel dispenser.

2. The content personalization system of claim 1, further comprising a lambda to analyze an event stream based on a set of processed command actions to determine a change in customer data for the user.

3. The content personalization system of claim 1, wherein the personalization engine is interfaced with the rule repository, the personalization rule handler, the campaign management system, and the customer data repository.

4. The content personalization system of claim 1, further comprising a content stack to deliver content based on the processed command messages.

5. The content personalization system of claim 1, wherein each action of the sequence of actions comprises at least one of a showImage command, a showImage event, a showAsset command, a showContent command, a showQuestion command, and a showQuestion event.

6. The content personalization system of claim 1, further comprising a bridge function to receive a raw message from the payment switch based on the swipe event, wherein the bridge function calls the step function module for each raw message.

7. The content personalization system of claim 4, wherein the interactive application retrieves content from the content stack based on the digital content payload contained in the one or more command messages.

8. The content personalization system of claim 1, wherein the digital server stores the one or more command messages, and wherein the digital server is in read/write communication with the personalization engine.

9. The content personalization system of claim 8, wherein the digital server receives data from the interactive application and passes at least a portion of the data to the customer data repository.

10. The content personalization system of claim 9, wherein the received data is a user input and the customer data repository updates a user profile associated with the user based on the user input.

11. A method for dynamic digital content personalization and delivery at a fuel dispenser, the method comprising:

receiving, by a payment switch of a fuel dispenser, a first input corresponding to a user;

generating, by a personalization engine, one or more command messages, each command message comprising a set of actions, each action of the set of actions corresponding to a command or an event to retrieve and/or display content on a display screen, wherein at least a portion of the set of actions comprises a digital content payload, wherein the personalization engine comprises a step function module comprising a plurality of lambda units and a personalization rule handler to process a collected dataset with a ruleset to generate the one or more command messages, wherein the step function module generates the collected dataset by retrieving data in parallel from a customer data repository, a campaign management system, and a rule repository, and wherein the personalization rule handler processes the collected data set with associated rules from the rule repository;

receiving, by a digital server, the one or more command messages including the sequence of actions comprising the digital content payload; and processing, by an interactive application in communication with a digital server, the one or more command messages comprising the set of actions wherein the processing comprises displaying content on a digital display of the fuel dispenser.

12. The method of claim 11, further comprising receiving at least a second input corresponding to a user, and generating another set of actions and/or updating a stored user profile.

13. The method of claim 11, wherein each action of the set of actions in the generated one or more command messages by the personalization engine are at least one of a showImage command, a showImage event, a showAsset command, a showContent command, a showQuestion command, and a showQuestion event.

14. The method of claim 11, wherein content assets are loaded from a content stack in response to the processing for display.

15. The method of claim 11, wherein the processing utilizes one or more sets of dynamic data.

16. The method of claim 11, wherein the step function module is called by a bridge function in response to a raw message generated by the first input.

17. The method of claim 16, wherein the set of actions is generated based in part on the personalization rule handler determining one or more rules to call based on received data including the first input.

18. The method of claim 11, wherein the set of actions is generated based at least in part on a context determined at the payment switch.

19. The method of claim 11, wherein the one or more command messages are stored at the digital server.

20. The method of claim 16, wherein the set of actions are passed to the interactive application via a digital server, wherein the digital server is further configured to provide one or more datasets to the customer data repository and/or the step function module.

* * * * *